United States Patent
Vyas et al.

(10) Patent No.: US 8,377,607 B2
(45) Date of Patent: *Feb. 19, 2013

(54) FUEL CELL CONTACT ELEMENT INCLUDING A TIO$_2$ LAYER AND A CONDUCTIVE LAYER

(75) Inventors: Gayatri Vyas, Rochester Hills, MI (US); Mahmoud H. Abd Elhamid, Grosse Pointe Woods, MI (US); Thomas A. Trabold, Pittsford, NY (US); Youssef M. Mikhail, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2555 days.

This patent is subject to a terminal disclaimer.

(21) Appl. No.: 11/201,767

(22) Filed: Aug. 11, 2005

(65) Prior Publication Data
US 2007/0003815 A1 Jan. 4, 2007

Related U.S. Application Data

(63) Continuation-in-part of application No. 11/172,021, filed on Jun. 30, 2005.

(51) Int. Cl.
*H01M 8/04* (2006.01)
*H01M 4/66* (2006.01)
*B05D 5/12* (2006.01)
(52) U.S. Cl. ............... 429/514; 429/519; 427/115
(58) Field of Classification Search .......... 427/115, 427/126.3; 429/457, 514, 519
See application file for complete search history.

(56) References Cited

U.S. PATENT DOCUMENTS

| 6,258,476 | B1 | 7/2001 | Cipollini |
| 6,294,281 | B1 * | 9/2001 | Heller ............................. 429/43 |
| 6,372,376 | B1 | 4/2002 | Fronk et al. |
| 6,733,911 | B2 | 5/2004 | Kawahara |
| 6,761,927 | B1 * | 7/2004 | Makkus et al. ............ 427/115 |
| 2003/0003345 | A1 * | 1/2003 | Ohara et al. ............... 429/38 |
| 2003/0228512 | A1 | 12/2003 | Vyas et al. |
| 2004/0091768 | A1 | 5/2004 | Abd Elhamid et al. |

FOREIGN PATENT DOCUMENTS

| DE | 10 2005 003 007 A1 | 9/2005 |
| DE | 10 2006 000 113 A1 | 12/2006 |
| JP | 08-071418 A | 3/1996 |
| JP | 07-277825 A | 10/1996 |
| JP | 10-228914 A | 8/1998 |
| JP | 10228914 A * | 8/1998 |
| JP | 11-106892 A | 4/1999 |

(Continued)

OTHER PUBLICATIONS

Kenneth Barbalace http://klbprouctions.com/. Periodic Table of Elements—Sorted by Electrical Conductivity. EnvironmentalChemistry.com. 1995-2009. Accessed on-line: Aug. 20, 2009. http://EnvironmentalChemistry.com/yogi/periodic/electrical.html.*

*Primary Examiner* — Barbara Gilliam
*Assistant Examiner* — Edu E Enin-Okut
(74) *Attorney, Agent, or Firm* — John A. Miller; Miller IP Group, PLC

(57) ABSTRACT

A flow field plate or bipolar plate for a fuel cell that includes a combination of TiO$_2$ and a conductive material that makes the bipolar plate conductive, hydrophilic and stable in the fuel cell environment. The TiO$_2$ and the conductive material can be deposited on the plate as separate layers or can be combined as a single layer. Either the TiO$_2$ layer or the conductive layer can be deposited first. In one embodiment, the conductive material is gold.

19 Claims, 2 Drawing Sheets

FOREIGN PATENT DOCUMENTS

| | | |
|---|---|---|
| JP | 11-273693 A | 10/1999 |
| JP | 2000-169147 A | 6/2000 |
| JP | 2002-358982 A | 12/2002 |
| WO | WO 03/026036 A2 | 3/2003 |

* cited by examiner

FUEL CELL CONTACT ELEMENT INCLUDING A TIO₂ LAYER AND A CONDUCTIVE LAYER

CROSS-REFERENCE TO RELATED APPLICATIONS

This application is a continuation-in-part application of U.S. patent application Ser. No. 11/172,021, titled Stable Conductive and Hydrophilic Fuel Cell Contact Element, filed Jun. 30, 2005.

BACKGROUND OF THE INVENTION

1. Field of the Invention

This invention relates generally to bipolar plates for fuel cells and, more particularly, to a bipolar plate for a fuel cell that includes a $TiO_2$ layer and a conductive layer that combine to make the plate conductive, hydrophilic and stable in a fuel cell environment.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs require certain conditions for effective operation, including proper water management and humidification, and control of catalyst poisoning constituents, such as carbon monoxide (CO).

Several fuel cells are typically combined in a fuel cell stack to generate the desired power. For the automotive fuel cell stack mentioned above, the stack may include about two hundred fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows.

The bipolar plates are typically made of a conductive material, such as stainless steel, titanium, aluminum, polymeric carbon composites, etc., so that they conduct the electricity generated by the fuel cells from one cell to the next cell and out of the stack. Metal bipolar plates typically produce a natural oxide on their outer surface that makes them resistant to corrosion. However, the oxide layer is not conductive, and thus increases the internal resistance of the fuel cell, reducing its electrical performance. Also, the oxide layer makes the plate more hydrophobic.

US Patent Application Publication No. 2003/0228512, assigned to the assignee of this application and herein incorporated by reference, discloses a process for depositing a conductive outer layer on a flow field plate that prevents the plate from oxidizing and increasing its ohmic contact. U.S. Pat. No. 6,372,376, also assigned to the assignee of this application, discloses depositing an electrically conductive, oxidation resistant and acid resistant coating on a flow field plate. US Patent Application Publication No. 2004/0091768, also assigned to the assignee of this application, discloses depositing a graphite and carbon black coating on a flow field plate for making the flow field plate corrosion resistant, electrically conductive and thermally conductive.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm², the water accumulates within the flow channels because the flow rate of the reactant gas is too low to force the water out of the channels. As the water accumulates, it forms droplets that continue to expand because of the relatively hydrophobic nature of the plate material. The contact angle of the water droplets is generally about 90° in that the droplets form in the flow channels substantially perpendicular to the flow of the reactant gas. As the size of the droplets increases, the flow channel is closed off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

It is usually possible to purge the accumulated water in the flow channels by periodically forcing the reactant gas through the flow channels at a higher flow rate. However, on the cathode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it is desirable to provide some relative humidity in the anode and cathode reactant gases so that the membranes in the fuel cells remain hydrated. A dry inlet gas has a drying effect on the membrane that could increase the cell's ionic resistance, and limit the membrane's long-term durability.

It has been proposed by the present inventors to make bipolar plates for a fuel cell hydrophilic to improve channel water transport. A hydrophilic plate causes water in the channels to form a thin film that has less of a tendency to alter the flow distribution along the array of channels connected to the common inlet and outlet headers. If the plate material is sufficiently wettable, water transport through the diffusion media will contact the channel walls and then, by capillary force, be transported into the bottom corners of the channel along its length. The physical requirements to support spontaneous wetting in the corners of a flow channel are described by the Concus-Finn condition, $$\beta + \frac{\alpha}{2} < 90°,$$

where β is the static contact angle and α is the channel corner angle. For a rectangular channel α/2=45°, which dictates that spontaneous wetting will occur when the static contact angle is less than 45°. For the roughly rectangular channels used in current fuel cell stack designs with composite bipolar plates, this sets an approximate upper limit on the contact angle needed to realize the beneficial effects of hydrophilic plate surfaces on channel water transport and low load stability.

A design concern needs to be addressed when providing a hydrophilic coating on bipolar plates in fuel cells. Because hydrophilic coatings have a high surface energy, they will attract particles and other contaminants entering the fuel cell from the gaseous fuel and/or oxygen streams, from humidifiers and upstream piping, or generated internally by other components, such as the MEA, diffusion media, seals, etc. Accumulation of these contaminants on the coating will, overtime, significantly reduce the hydropholicity of the coating. Even if provisions are made to control contamination through the use of gas filtering and ultra-clean components, it is unlikely that degradation of a hydrophilic coating or other surface treatment would not occur during the desired 6000 hour lifetime of a fuel cell.

SUMMARY OF THE INVENTION

In accordance with the teachings of the present invention, a flow field plate or bipolar plate for a fuel cell is disclosed that includes a combination of $TiO_2$ and a conductive material that makes the bipolar plate conductive, hydrophilic and stable in the fuel cell environment. The $TiO_2$ and the conductive material can be deposited on the plate as separate layers or can be combined as a single layer. Either the $TiO_2$ layer or the conductive layer can be deposited first.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a bipolar plate for a fuel cell that includes a metal oxide layer and a conductive layer for making the bipolar plate conductive, hydrophilic and stable in a fuel cell environment is merely exemplary in nature, and is in no way intended to limit the invention or its applications or uses.

Figure 1:
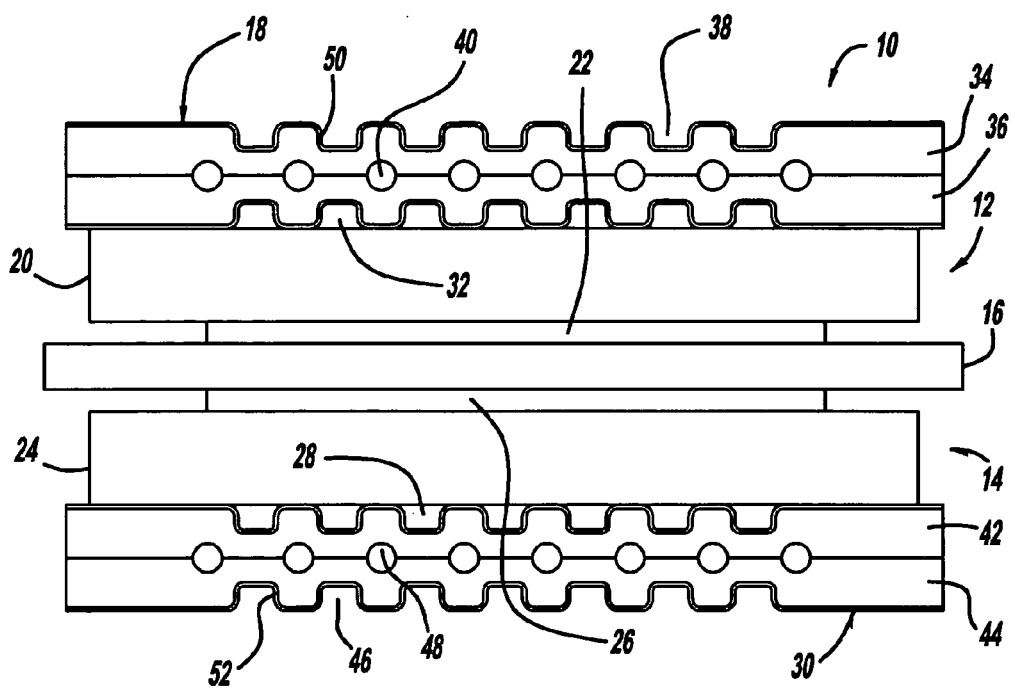
FIG. 1 is a cross-sectional view of a fuel cell in a fuel cell stack that includes a bipolar plate having a metal oxide coating that makes the plate conductive, hydrophilic and stable in a fuel cell environment.

FIG. 1 is a cross-sectional view of a fuel cell 10 that is part of a fuel stack of the type discussed above. The fuel cell 10 includes a cathode side 12 and an anode side 14 separated by a perfluorosulfonic acid membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 18 is provided on the cathode side 12 and an anode side flow field plate or bipolar plate 30 is provided on the anode side 14. The bipolar plates 18 and 30 are provided between the fuel cells in the fuel cell stack. A hydrogen reactant gas flow from flow channels 28 in the bipolar plate 30 reacts with the catalyst layer 26 to dissociate the hydrogen ions and the electrons. Airflow from flow channels 32 in the bipolar plate 18 reacts with the catalyst layer 22. The hydrogen ions are able to propagate through the membrane 16 where they carry the ionic current through the membrane. The end product is water, which does not have any negative impact on the environment.

In this non-limiting embodiment, the bipolar plate 18 includes two sheets 34 and 36 that are stamped and welded together. The sheet 36 defines the flow channels 32 and the sheet 34 defines flow channels 38 for the anode side of an adjacent fuel cell to the fuel cell 10. Cooling fluid flow channels 40 are provided between the sheets 34 and 36, as shown. Likewise, the bipolar plate 30 includes a sheet 42 defining the flow channels 28, a sheet 44 defining flow channels 46 for the cathode side of an adjacent fuel cell, and cooling fluid flow channels 48. In the embodiments discussed herein, the sheets 34, 36, 42 and 44 are made of an electrically conductive material, such as stainless steel, titanium, aluminum, polymeric carbon composites, etc.

According to one embodiment of the present invention, the bipolar plates 18 and 30 have a metal oxide layer 50 and 52, respectively, that make the plates 18 and 30 conductive, corrosion resistant, hydrophilic and stable in the fuel cell environment. In one embodiment, the metal oxide layers 50 and 52 are doped with a suitable dopant. The hydrophilicity of the layers 50 and 52 causes the water within the flow channels 28 and 32 to form a film instead of water droplets so that the water does not significantly block the flow channel. Particularly, the hydrophilicity of the layers 50 and 52 decreases the contact angle of water accumulating in the flow channels 32, 38, 28 and 46, preferably below 20°, so that the reactant gases delivers the flow through the channels at low loads.

Further, the dopant in the metal oxide is selected to increase the conductivity of the layers 50 and 52. By making the bipolar plates 18 and 30 more conductive, the electrical contact resistance between the fuel cells and the losses in the fuel cell are reduced, thus increasing cell efficiency. Also, an increase in the conductivity of the layers 50 and 52 provides a reduction in compression force in the stack can be provided, addressing certain durability issues within the stack. In one embodiment, the dopant is selected so that the conductivity of the layers 50 and 52 is similar to gold.

Further, the dopant in the layers 50 and 52 is selected to make the layers 50 and 52 stable, i.e., corrosion resistant. Particularly, as is well understood in the art, hydrofluoric acid (HF) is generated as a result of degradation of the perfluorosulfonic ionomer in the membrane 16 during operation of the fuel cell 10. The hydrofluoric acid has a corrosive effect on some of the materials discussed herein, particularly material of the bipolar plates 18 and 30. The metal oxide layers 50 and 52 prevent the bipolar plates 18 and 30, respectively, from corroding.

Suitable metal oxides for the layers 50 and 52 include, but are not limited to, hafnium dioxide ($HfO_2$), zirconium dioxide ($ZrO_2$), aluminum oxide ($Al_2O_3$), tin oxide ($SnO_2$), tantalum pent-oxide ($Ta_2O_5$), niobium pent-oxide ($Nb_2O_5$), molybdenum dioxide ($MoO_2$), iridium dioxide ($IrO_2$), ruthenium dioxide ($RuO_2$) and mixtures thereof. Suitable dopants can be selected from materials that can create suitable point defects, such as N, C, Li, Ba, Pb, Mo, Ag, Au, Ru, Re, Nd, Y, Mn, V, Cr, Sb, Ni, W, Zr, Hf, etc. and mixtures thereof. In one particular embodiment, the doped metal oxide is niobium (Nb) and tantalum (Ta) doped titanium oxide ($TiO_2$) and fluorine (F) doped tin oxide ($SnO_2$). The amount of dopant in the layers 50 and 52 can be in the range of 0-10% of the composition of the layers 50 and 52 in one embodiment.

Figure 2:
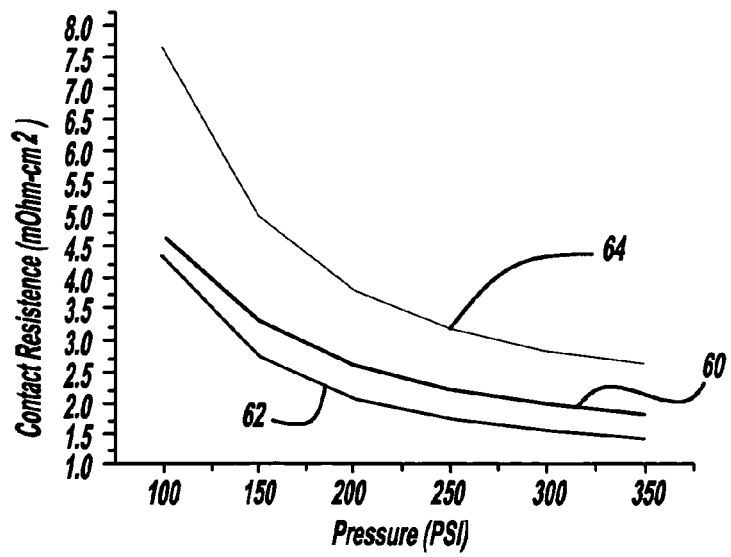
FIG. 2 is a graph with pressure on the horizontal axis and contact resistance on the vertical axis showing electrical contact resistance versus compression pressure for bipolar plates.

FIG. 2 is a graph with pressure on the horizontal axis and contact resistance on the vertical axis showing electrical contact resistance versus compression pressure for bipolar plates. Particularly, graph line 60 is a control contact resistance, graph line 62 is the contact resistance for Nb doped $TiO_2$ and graph line 64 is the contact resistance for F doped $SnO_2$.

In an alternate embodiment, the metal oxide layers 50 and 52 are non-stoichiometric metal oxide layers. The non-stoichiometric metal oxide includes oxygen vacancies in the lattice structure of the metal oxide. The metal oxide provides the hydrophilicity. The vacancies allow electrons in the valence band to jump to the conduction band of the metal oxide to provide the conductivity. Further, the non-stoichiometric metal oxide reduces the hydrophobic effect of contaminants adhering to the surface. Particularly, the non-stoichiometric metal oxide acts as an oxidizing agent where the contaminants get oxidized, similar to a self-cleaning window, making the metal oxide layers 50 and 52 both hydrophilic and conductive. A suitable example of a non-stoichiometric metal oxide includes, but is not limited to, $TiO_x$, where x is in the range of 0.1-6.

According to the invention, $TiO_2$ is one metal oxide that can be used for the layers 50 and 52 that make the bipolar plates 18 and 30 hydrophilic and stable in a fuel cell environment. The conductivity of the bipolar plates 18 and 30 can be achieved by providing a conductive material in combination with the $TiO_2$ layers 50 and 52. In one embodiment, the conductive material can be mixed with $TiO_2$ to define the layers 50 and 52 and provide the increased conductivity. Any suitable process can be used to mix the $TiO_2$ with the conductive material, such as a magnetron sputtering process. The conductive material can be any suitable conductive material for the purposes discussed herein, including, but not limited to, gold (Au), silver (Ag), ruthenium (Ru), rhodium (Rh), palladium (Pd), platinum (Pt), osmium (Os), iridium (Ir), hafnium (Hf), rare earth metals, etc.

Figure 3:
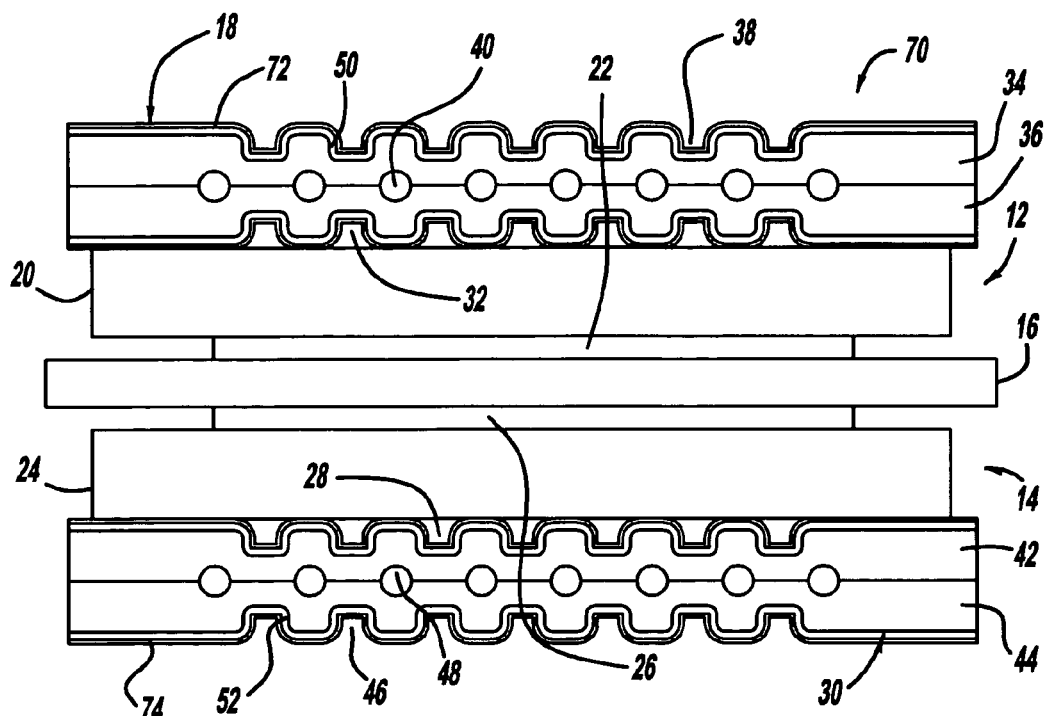
FIG. 3 is a cross-sectional view of a fuel cell in a fuel cell stack that includes a bipolar plate having a $TiO_2$ layer and a conductive layer that combine to make the plate conductive, hydrophilic and stable in the fuel cell environment.

Further, a separate conductive layer can be deposited in combination with the metal oxide layers 50 and 52. FIG. 3 is a cross-sectional view of a fuel cell 70 similar to the fuel cell 10, where like elements are identified by the same reference numeral. In this embodiment, the metal oxide layers 50 and 52 are $TiO_2$ layers. To make the plates 18 and 30 more conductive, a thin conductive layer 72 is deposited on the metal oxide layer 50 and a thin conductive layer 74 is deposited on the metal oxide layer 52. In one embodiment, the conductive layers 72 and 74 are gold, although other conductive materials may be applicable, such as those mentioned above. Further, the conductive layers 72 and 74 are very thin, generally on the order of 2-10 nm, so that the hydrophilic nature of the metal oxide layers 50 and 52 is provided through the conductive layers 72 and 74. In an alternate embodiment, the conductive layers 72 and 74 can be deposited on the bipolar plates 18 and 30, respectively, before the metal oxide layers 50 and 52 are deposited on the plates 18 and 30.

Before the layers 50 and 52 are deposited on the bipolar plates 18 and 30, the bipolar plates 18 and 30 are cleaned by a suitable process, such as ion beam or magnetron sputtering, to remove the resistive oxide film on the outside of the plates 18 and 30 that may have formed. The metal oxide layers 50 and 52 can be deposited on the bipolar plates 18 and 30 by any suitable technique including, but not limited to, physical vapor deposition processes, chemical vapor deposition (CVD) processes, thermal spraying processes, spin coating processes, dip coating processes and sol-gel processes. Suitable examples of physical vapor deposition processes include electron beam evaporation, magnetron sputtering and pulsed plasma processes. Suitable chemical vapor deposition processes include plasma enhanced CVD and atomic layer deposition processes. In one embodiment, the layers 50 and 52 are deposited to a thickness in the range of 5-1000 nm.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell comprising a flow field plate being made of a plate material, said flow field plate including a plurality of flow channels responsive to a reactant gas, said flow field plate further including a $TiO_2$ layer and a conductive layer that combine to make the plate conductive, hydrophilic and stable in a fuel cell environment, wherein the conductive layer is deposited on the flow field plate before the $TiO_2$ layer.

2. The fuel cell according to claim 1 wherein the plate material is selected from the group consisting of stainless steel, titanium, aluminum and a polymer-carbon composite based material.

3. The fuel cell according to claim 1 wherein the conductive layer is a gold layer.

4. The fuel cell according to claim 1 wherein the $TiO_2$ layer provides a contact angle for water accumulating in the flow channels to be below 20°.

5. The fuel cell according to claim 1 wherein the $TiO_2$ layer is resistant to surface contamination.

6. The fuel cell according to claim 1 wherein the $TiO_2$ layer has a thickness in the range of 5-1000 nm.

7. The fuel cell according to claim 1 wherein the conductive layer has a thickness in the 2-10 nm range.

8. The fuel cell according to claim 1 wherein the $TiO_2$ layer and the conductive layer are deposited on the flow field plate by a process selected from the group consisting of an electron beam evaporation process, magnetron sputtering, a pulse plasma process, plasma enhanced chemical vapor deposition, an atomic layer deposition process, thermal spraying, spin coating, dip coating and a sol-gel process.

9. The fuel cell according to claim 1 wherein the flow field plate is selected from the group consisting of anode side flow field plates and cathode side flow field plates.

10. The fuel cell according to claim 1 wherein the fuel cell is part of a fuel cell stack on a vehicle.

11. A fuel cell comprising a flow field plate being made of a plate material, said flow field plate including a plurality of flow channels responsive to a reactant gas, said flow field plate including an outer layer being a mixture of $TiO_2$ and a conductive material that makes the plate conductive, hydrophilic and stable in a fuel cell environment.

12. The fuel cell according to claim 11 wherein the plate material is selected from the group consisting of stainless steel, titanium, aluminum and a polymer-carbon composite based material.

13. The fuel cell according to claim 11 wherein the conductive material is gold.

14. The fuel cell according to claim 11 wherein the outer layer provides a contact angle for water accumulating in the flow channels to be below 20°.

15. The fuel cell according to claim 11 wherein the outer layer is resistant to surface contamination.

16. The fuel cell according to claim 11 wherein the outer layer has a thickness in the range of 5-1000 nm.

17. The fuel cell according to claim 11 wherein the outer layer is deposited on the flow field plate by a process selected from the group consisting of an electron beam evaporation process, magnetron sputtering, a pulse plasma process, plasma enhanced chemical vapor deposition, an atomic layer deposition process, thermal spraying, spin coating, dip coating and a sol-gel process.

18. The fuel cell according to claim 11 wherein the flow field plate is selected from the group consisting of anode side flow field plates and cathode side flow field plates.

19. The fuel cell according to claim 11 wherein the fuel cell is part of a fuel cell stack on a vehicle.

\* \* \* \* \*